May 24, 1938.　　　　K. KLÖNE　　　　2,118,205
APPARATUS FOR BRIQUETTING METAL SHAVINGS
Filed Jan. 21, 1936　　　2 Sheets-Sheet 1
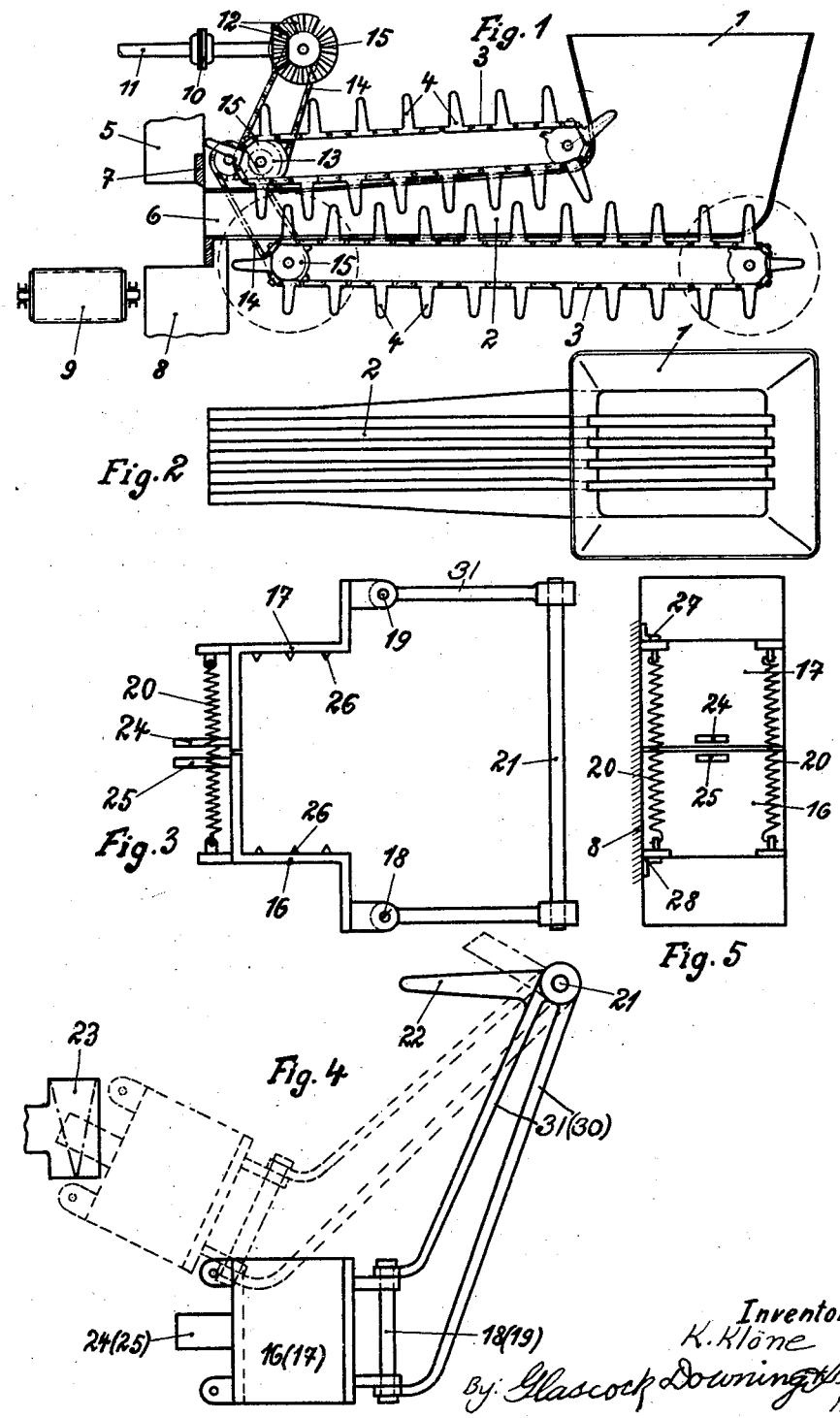

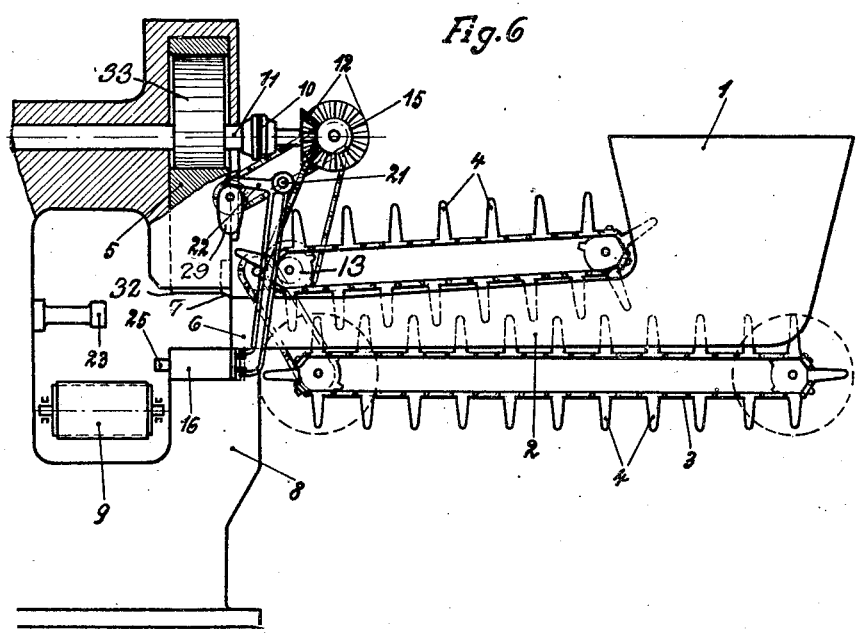

Patented May 24, 1938

2,118,205

UNITED STATES PATENT OFFICE 2,118,205

APPARATUS FOR BRIQUETTING METAL SHAVINGS

Kurt Klöne, Dusseldorf, Germany

Application January 21, 1936, Serial No. 60,129
In Germany January 25, 1935

7 Claims. (Cl. 29—1)

This invention relates to an apparatus for briquetting metal shavings, more particularly woolly tenacious shavings. It has already been proposed to feed steel shavings or the like from a delivery station to a cutting device by a conveyor acting continuously in the same direction. According to the invention, shears having two knives are used as a cutting device, the reciprocating knife carrier of which is designed as a press die and when cutting, it compresses the packets of shavings to the desired extent. In the apparatus according to the present invention, the shavings are formed into handy packets so that the conveyance thereof does not meet with difficulties. It is immaterial whether pieces of iron are contained in the shavings or not.

Instead of designing the lower press cheek of the shears itself as mold for the packets of shavings, it is advisable to arrange on the lower press cheek of the shears a packet mold comprising two relatively foldable frame members held together by spring pressure. In order to prevent the packet mold from opening during the pressing operation, abutments or stops for the frame members of the packet mold are provided on the lower press cheek. It is advisable to connect the packet mold by rods or the like to the driving mechanism of the press so that the packet mold is raised after the pressing operation and is moved with projections on both sides of the joint against a wedge-shaped abutment so that the members or halves of the mold automatically open and the packet drops out. In this case, the packet mold is lifted by the press die preferably during its return stroke over a lever from the support and is again placed thereon during the working stroke. In order that the packets during the raising of the mold until it is opened will be held fast in the mold, the packet mold is preferably provided on the inside with points or similar projections. In order that the shears press used for pressing the packets may have a small stroke, it is advisable to provide the briquetting apparatus with a conveyor by means of which the shavings are fed to the shears in a preliminarily pressed form. For this purpose, a conveyor may be used, which consists of a shaft tapering toward the cutting device to about the dimensions of the packets to be produced, the upper and lower walls including endless members in the form of bands, chains or rollers which are provided with projections for carrying along the shavings. The projections of the chains, bands or rollers may consist of several rows of adjacent narrow hooks, the hooks of the opposite walls being staggered and protruding at the same time. Since the shavings fed by the conveyor in a preliminarily press form possess a comparatively high degree of stiffness, the cutting device must participate during the cutting operation in the feeding movement of the shavings and then return to its original position or the conveyor must be moved during the cutting of the shears away from the shears and when the shears are opened, the conveyor is again moved thereto. These movements may preferably be effected by a crank drive or the like. In this case, the conveyor or the shears press may be mounted on wheels for facilitating the movement.

A constructional form of the apparatus according to the invention is shown by way of example in the accompanying drawings.

Figures 1 and 2 show the apparatus diagrammatically in side elevation and plan respectively, Figures 3 to 5 show the packet mold in various views, Figure 6 shows a putting together of the entire briquetting plant.

1 is the feeding hopper into which the shavings are brought, for example, by a gripping member. 2 is the conveyor consisting of a shaft, the cross-sectional area of which tapers toward the cutting device in accordance the packet mold to be produced. The upper and lower walls of the shaft are formed by the conveyor elements proper. These are endless chains 3 which possess several adjacent rows of hook-shaped gripping members 4 which are staggered and protrude over each other. They convey the shavings continuously to the cutting device 5 which consists of vertical shears having a stationary cutter and a movable cutter. There is provided between the shears and the conveyor a storage chamber 6 in which the shavings may be compressed when the shears are closed. The said chamber may, for example, be 70 centimeters long. This chamber is formed by the four walls of the shaft of the conveyor, and one end of this chamber is defined by the gripping members 4 of the upper and lower endless chains which lie within the shaft of the conveyor 2 near the knives or cutters. The opposite end of this chamber is normally open to allow the material to be delivered to the cutters, and is closed only when the vertically reciprocating cutter 7 reaches the limit of its downward stroke. The upper cutter 7 is designed as press die whereby the severed shavings are compressed to the desired extent on the stationary knife carrier 8. The upper cutter or knife 7 is secured to a vertically reciprocating member 32 (Fig. 6). The member 32 is provided with a bore in which a disc 33 is rotatably mounted. The disc 33 is eccentrically mounted on the main driving shaft 11 of the machine and coupled with the latter. During the rotation of the shaft 11, the member 32 and the cutter 7 attached thereto, are forced downwardly and upwardly in accordance with the eccentricity of the disc 33. A conveyor belt 9 is arranged behind the cutting device and the finished packets pass to the belt in order to be brought to the loading place.

The conveyor is driven by a coupling 10 from the main shaft 11 of the shears and by bevel gear 12 and spur gearing 13 by means of chains 14 and chain wheels 15.

The support 8 may be hydraulically supported as is well known in connection with presses so that it can be displaced downward when a certain pressure is exceeded. An overloading of the machine by excessively agglomerated shavings and by metal pieces of larger dimensions passing between the same is thereby prevented. The packet mold comprising the two halves or members 16 and 17 is provided on the support. The halves or members 16 and 17 of the mold are separately and swingably mounted on bolts or pins 18 and 19 and held together by the springs 20. The bolts or pins 18 and 19 are provided on one end of levers 30 and 31, which levers are secured at their opposite ends to the shaft 21. The shaft 21 is secured or pivotally mounted on the machine in any suitable manner. One or both of the levers 30, 31, may be provided near the shaft 21 with an abutment 22. The packet mold is adapted to swing with the parts 16, 17, 18, 19 and 30, 31 about the horizontal axis 21. The swinging movement is obtained in such a manner that a cam 29 (Figure 6), which is driven from the bevel gear 12, forces the abutment 22 upward during the upward movement of the upper knife or cutter 7 whereby the packet mold swings upward about the axis 21. During this swinging movement, the abutments 24 and 25 of the two halves or members 16 and 17 of the mold bear against the wedge 23 which during the further movement forces apart the abutments 24 and 25 and also the members 16 and 17 of the mold against the pressure of the springs 20. The enclosed packet of shavings, which has hitherto been held by the projections 26, drops out of the mold onto the conveyor belt 9. When the upper knife or cutter 7 has reached its highest position, the cam 29 allows the abutment 22 to swing downward whereby the packet mold simultaneously returns to its initial position on the lower knife carrier 8. The members 16 and 17 of the mold close again after the abutments 24 and 25 slide off the wedge 23 under the action of the springs 20. The raised position of the packet mold is indicated by dash lines in Figure 4. The abutments or stops 27, 28 on the support 8 prevent an opening of the two halves or members of the mold during the pressing operation.

The drive of the shears may be mechanical or hydraulic, the hydraulic drive being more advantageous owing to the pressing operation being combined with the cutting operation.

What is claimed as new and desired to be secured by Letters Patent is:

1. Apparatus for briquetting metal shavings, more particularly woolly tenacious shavings, including a delivery station, a cutting device, a conveyor continuously acting in the same direction for feeding the shavings from the delivery station to the cutting device, said conveyor comprising a shaft tapering toward the cutting device, conveying members included in at least two of the opposite walls of the shaft, said cutting device including two knives one of which is movable with respect to the other, carriers for said knives, and said carriers forming dies for compressing the shavings into packets during the cutting operation.

2. Apparatus for briquetting metal shavings, more particularly woolly tenacious shavings, including a delivery station, a cutting device, a conveyor continuously acting in the same direction for feeding the shavings from the delivery station to the cutting device, said cutting device comprising two knives, one of which is movable with respect to the other, carriers for said knives, said carriers forming press dies so as to compress the shavings into packets during the cutting operation, a packet mold consisting of two relatively foldable frame members arranged on the lower press die, spring means for normally holding said frame members together, and abutments mounted on the lower press die to prevent the packet mold from being opened during the pressing operation.

3. Apparatus for briquetting metal shavings, more particularly woolly tenacious shavings, including a delivery station, a cutting device, a conveyor continuously acting in the same direction for feeding the shavings from the delivery station to the cutting device, said cutting device comprising two knives, one of which is movable with respect to the other, carriers for said knives, said carriers forming press dies so as to compress the shavings into packets during the cutting operation, a packet mold consisting of two relatively foldable frame members arranged on the lower press die, spring means for normally holding said frame members together, means for raising the packet mold after the pressing operation, and a wedge-shaped abutment member against which projections on the frame members of the mold contact to effect opening of the mold and the dropping of the packet.

4. Apparatus for briquetting metal shavings, more particularly woolly tenacious shavings, including a delivery station, a cutting device, a conveyor continuously acting in the same direction for feeding the shavings from the delivery station to the cutting device, said cutting device comprising two knives, one of which is movable with respect to the other, carriers for said knives, said carriers forming press dies so as to compress the shavings into packets during the cutting operation, a packet mold consisting of two relatively foldable frame members arranged on the lower press die, spring means for normally holding said frame members together, and co-acting means for lifting the packet mold from the support by the press die during its return stroke and for placing the packet mold on the support again during the working stroke.

5. Apparatus for briquetting metal shavings, more particularly woolly tenacious shavings, including a delivery station, a cutting device, a conveyor continuously acting in the same direction for feeding the shavings from the delivery station to the cutting device, said cutting device comprising two knives, one of which is movable with respect to the other, carriers for said knives, said carriers forming press dies so as to compress the shavings into packets during the cutting operation, a packet mold consisting of two relatively foldable frame members arranged on the lower press die, spring means for normally holding said frame members together, and the packet mold being provided on the inside with projections for holding the packets.

6. Apparatus for briquetting metal shavings, more particularly woolly tenacious shavings, including a delivery station, a cutting device, a conveyor continuously acting in the same direction for feeding the shavings from the delivery station to the cutting device, said conveyor comprising a shaft tapering toward the cutting device, at least two of the opposite walls of the shaft consisting of endless bands and chains which are provided with individual projections for the shavings and arranged in several adjacent rows, the said cutting device containing two knives, one of which is movable with respect to the other, carriers for said knives, said carriers forming dies for compressing the shavings into packets during the cutting operation.

7. Apparatus for briquetting metal shavings, more particularly woolly tenacious shavings, including a delivery station, a cutting device, a conveyor continuously acting in the same direction for feeding the shavings from the delivery station to the cutting device, said conveyor comprising a shaft tapering toward the cutting device, at least two of the opposite walls of the shaft consisting of endless bands or chains which are provided with individual projections for the shavings and arranged in several adjacent rows, the said projections protruding over each other and disposed at approximately the same distance from each other, the said cutting device containing two knives, one of which is movable with respect to the other, carriers for the said knives, said carriers forming dies for compressing the shavings into packets during the cutting operation.

KURT KLÖNE.